United States Patent
Eom et al.

(10) Patent No.: US 12,066,889 B2
(45) Date of Patent: Aug. 20, 2024

(54) STORAGE DEVICE USING HOST MEMORY AND OPERATING METHOD THEREOF

(71) Applicant: SAMSUNG ELECTRONICS CO., LTD., Suwon-si (KR)

(72) Inventors: Kicheol Eom, Seoul (KR); Jaeho Sim, Seoul (KR); Dong-Ryoul Lee, Incheon (KR); Hyun Ju Yi, Hwaseong-si (KR); Hyotaek Leem, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 493 days.

(21) Appl. No.: 17/239,621

(22) Filed: Apr. 25, 2021

(65) Prior Publication Data

US 2021/0248035 A1 Aug. 12, 2021

Related U.S. Application Data

(63) Continuation of application No. 16/533,894, filed on Aug. 7, 2019, now Pat. No. 11,016,846.

(30) Foreign Application Priority Data

Nov. 9, 2018 (KR) ........................ 10-2018-0137228

(51) Int. Cl.
  *G06F 11/10* (2006.01)
  *G06F 3/06* (2006.01)
  (Continued)

(52) U.S. Cl.
  CPC ........ *G06F 11/1068* (2013.01); *G06F 3/0619* (2013.01); *G06F 3/0656* (2013.01); *G06F 3/0659* (2013.01); *G06F 3/0679* (2013.01); *G06F 13/1668* (2013.01); *G06F 13/28* (2013.01); *G06F 13/4282* (2013.01)

(58) Field of Classification Search
  CPC .. G06F 11/1068; G06F 3/0679; G06F 3/0619; G06F 3/0659; G06F 3/0656; G06F 13/428; G06F 13/1668; G06F 13/28
  See application file for complete search history.

(56) References Cited

U.S. PATENT DOCUMENTS

| 8,341,311 B1 | 12/2012 | Szewerenko et al. |
| 8,375,257 B2 | 2/2013 | Hong et al. |
| (Continued) | | |

FOREIGN PATENT DOCUMENTS

| CN | 101373449 A | 2/2009 |
| CN | 106126447 A | 11/2016 |
| (Continued) | | |

OTHER PUBLICATIONS

Chinese Examination Report Dated Apr. 28, 2023, Cited in Corresponding Chinese Patent Application.

(Continued)

*Primary Examiner* — Samir W Rizk
(74) *Attorney, Agent, or Firm* — Fish & Richardson P.C.

(57) ABSTRACT

A storage device sharing a host memory of a host, the storage device includes a serial interface that exchanges data with the host, and a storage controller that stores buffering data in a host memory buffer allocated by the host through the serial interface. The storage controller performs error correction encoding and error correction decoding on the buffering data.

12 Claims, 15 Drawing Sheets

(51) Int. Cl.
*G06F 13/16* (2006.01)
*G06F 13/28* (2006.01)
*G06F 13/42* (2006.01)

(56) References Cited

U.S. PATENT DOCUMENTS

| | | |
|---|---|---|
| 8,543,742 B2 | 9/2013 | Yu et al. |
| 8,751,900 B2 | 6/2014 | Kim et al. |
| 8,904,088 B2 | 12/2014 | Heo et al. |
| 9,189,397 B2 | 11/2015 | Jung et al. |
| 10,002,405 B2 | 6/2018 | Barstow et al. |
| 10,025,747 B2 | 7/2018 | Swarbrick et al. |
| 10,061,521 B2 | 8/2018 | Yun et al. |
| 10,108,371 B2 | 10/2018 | Nimmagadda et al. |
| 11,362,685 B2 | 6/2022 | Hirano et al. |
| 2009/0319840 A1 | 12/2009 | Hara et al. |
| 2011/0119551 A1* | 5/2011 | Tsern ............... H03M 13/03 714/751 |
| 2014/0198573 A1* | 7/2014 | Jung ............... G06F 11/1048 365/185.12 |
| 2016/0350186 A1* | 12/2016 | Blaum ............... H03M 13/293 |
| 2017/0131917 A1 | 5/2017 | Yun et al. |
| 2017/0206030 A1 | 7/2017 | Woo et al. |
| 2017/0300246 A1* | 10/2017 | Michaeli ............... G06F 3/0688 |
| 2018/0067684 A1 | 3/2018 | Benisty et al. |
| 2018/0102182 A1* | 4/2018 | Zhou ............... G11C 29/36 |
| 2019/0042364 A1* | 2/2019 | Edirisooriya ....... G06F 11/1076 |
| 2019/0129834 A1* | 5/2019 | Purkayastha ......... G06N 20/00 |
| 2021/0034457 A1* | 2/2021 | Kim ............... G06F 11/0772 |

FOREIGN PATENT DOCUMENTS

| | | |
|---|---|---|
| CN | 107403645 A | 11/2017 |
| KR | 20110125892 A | 11/2011 |
| KR | 20170054633 A | 5/2017 |
| KR | 20180054394 A | 5/2018 |

OTHER PUBLICATIONS

Korean Examination Report Dated Mar. 14, 2023 Cited Iin Corresponding Korean Patent Application.

* cited by examiner

STORAGE DEVICE USING HOST MEMORY AND OPERATING METHOD THEREOF

CROSS-REFERENCE TO RELATED APPLICATIONS

This is a Continuation of U.S. application Ser. No. 16/533,894, filed Aug. 7, 2019, and a claim of priority under 35 U.S.C. § 119 is made to Korean Patent Application No. 10-2018-0137228 filed on Nov. 9, 2018, in the Korean Intellectual Property Office, the entire content of which is hereby incorporated by reference.

BACKGROUND

The present inventive concepts described herein relate to semiconductor memory devices, and more particularly to storage devices using memory of a host and an operating method thereof.

Solid state drive (hereinafter referred to as "SSD") is an example of a flash memory-based mass storage device. The demand for SSDs has increased greatly as SSDs have been used for various purposes. For example, SSDs have been used in servers, by clients, and in data centers, among other uses. An interface of an SSD should provide the best speed and reliability for each purpose. To satisfy such demand, interfaces such as serial AT attachment (SATA) interface, PCI Express (PCIe) interface, and serial attached SCSI (SAS) have been used in an effort to provide high speed and high reliability. In particular, PCIe-based NVMe or UFS-based UME (Unified Memory Extension) are being developed and applied to storage devices. The interface provides a memory sharing function between devices. Accordingly, a data managing method is required with regard to storage devices which use a scheme to share memory resources.

In general, storage devices may include a separate volatile memory to enable quick access to mapping tables. Data storage devices may store the mapping tables in the volatile memory when power is turned on. The above-described volatile memory may be for example dynamic random access memory (DRAM) or static random access memory (SRAM). The use of volatile memory however results in increased area and cost of the storage device.

SUMMARY

Embodiments of the inventive concepts provide a storage device which provides reliability of buffering data in a system that uses an interface to which a memory resource sharing scheme is applied, and an operating method thereof.

Embodiments of the inventive concepts provide a storage device sharing a host memory of a host, the storage device including a serial interface that exchanges data with the host; and a storage controller connected to the host through the serial interface, and that stores buffering data in a host memory buffer allocated by the host and that performs error correction encoding and error correction decoding on the buffering data.

Embodiments of the inventive concepts further provide an operating method of a storage device which is allocated a host memory of a host as a buffer. The method includes reading, at the storage device, buffering data from the buffer; detecting an error of the buffering data by using a first error code correction engine; and requesting, by the storage device, the buffering data from the host when the detected error is uncorrectable by the first error correction code engine.

Embodiments of the inventive concepts still further provide a storage device including an interface that exchanges data with the host; a nonvolatile memory device; and a storage controller connected to the interface, and that stores buffering data in a partial region of a host memory of the host allocated as a buffer, controls the nonvolatile memory device responsive to the buffering data, and performs error correction encoding and error correction decoding on the buffering data. The storage controller replaces a lost portion of a packet of the buffering data that is lost when an error occurs at the interface during receiving the buffering data, wherein the lost portion is replaced with dummy data.

Embodiments of the inventive concepts also provide a memory system including a host including a host memory and configured to allocate a partial region of the host memory as a host memory buffer; and a storage device configured as a master to manage the host memory buffer without intervention of the host. The storage device including a storage controller configured to identify a type of access request to the host memory buffer. When the access request is identified as a read operation, the storage controller is configured to read first data from the host memory buffer and to perform error correction decoding on the first data, and when the access request is identified as a write operation, the storage controller is configured to perform error correction encoding on second data, and to write the error correction encoded second data in the host memory buffer.

BRIEF DESCRIPTION OF THE FIGURES

The above and other objects and features of the inventive concepts will become apparent in view of the following detail description of exemplary embodiments with reference to the accompanying drawings.

DETAILED DESCRIPTION

Figure 1:
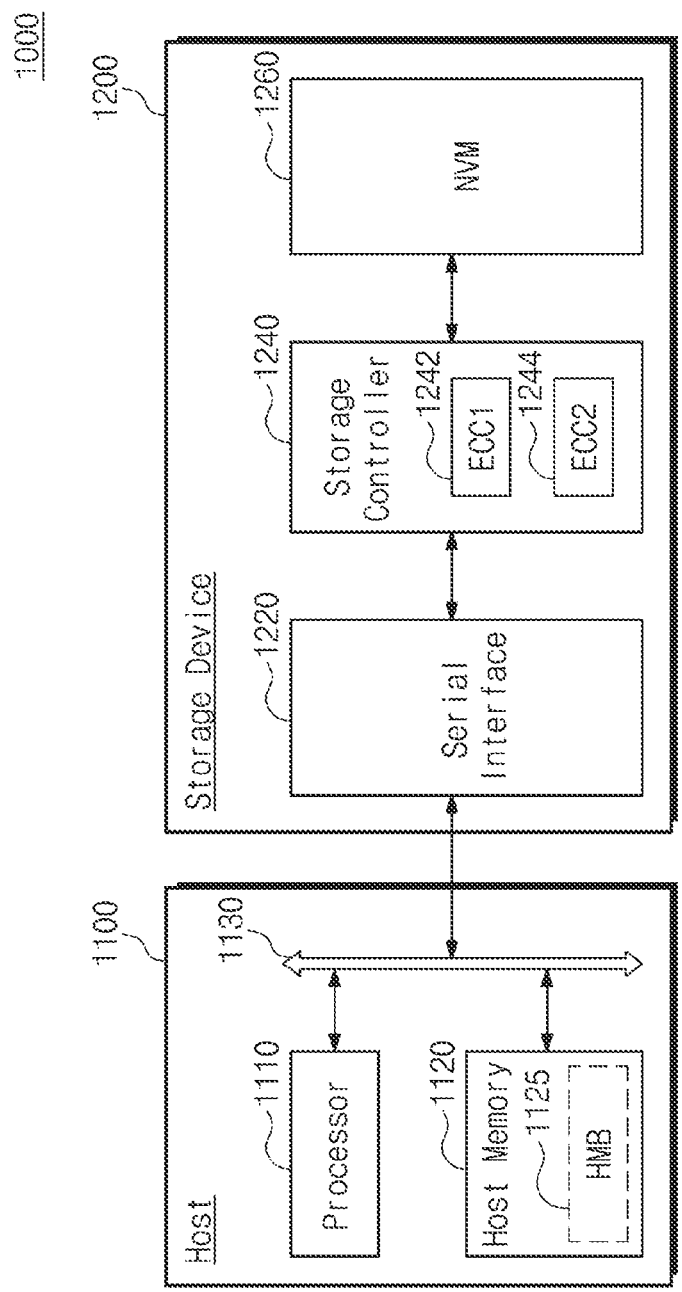
FIG. 1 illustrates a block diagram of a computer system to which a storage device is connected, according to embodiments of the inventive concepts.

Hereinafter, embodiments of the inventive concepts will be described clearly and in detail with reference to the accompanying drawings to such an extent that one of ordinary skill in the art may implement embodiments of the inventive concepts. Wherever possible, the same reference numerals are used in the drawings and the description to refer to the same or similar parts.

Hereinafter, a solid state drive (SSD) using a flash memory device will be used as an example of a storage device for describing the features and functions of the inventive concepts. However, one skilled in the art should readily understand other merits and performance of the inventive concepts depending on the contents disclosed herein. The inventive concepts may be implemented or applied through other embodiments. In addition, the detailed description may be changed or modified according to view points and applications without departing from the claims, and the scope and spirit, and any other purposes, of the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

FIG. 1 illustrates a block diagram of a computer system to which a storage device is connected, according to embodiments of the inventive concepts. Referring to FIG. 1, a computer system 1000 includes a host 1100 and a storage device 1200. The computer system 1000 may be an electronic device such as for example a desktop computer, a laptop computer, a tablet computer, a smartphone, a wearable device, a workstation, one or more servers, an electric vehicle, home applications, a medical device, or the like.

The host 1100 may access the storage device 1200, for example, for the purpose of reading data. The storage device 1200 stores data in or reads data from a nonvolatile memory device (NVM) 1260 in response to a write or read request of the host 1100. In particular, the storage device 1200 may use a host memory buffer (HMB) 1125 provided in the host 1100 as a data buffer. As a master, the storage device 1200 may manage a region of the host memory buffer 1125 of the host memory 1120 provided in the host 1100. In particular, the storage device 1200 may encode data stored in the host memory buffer 1125 to an error correction code (hereinafter referred to as an "ECC"). This will be in more detail described hereinafter.

The host 1100 may write data in the storage device 1200 or may read data stored in the storage device 1200. The host 1100 may provide a command and an address to the storage device 1200 for the purpose of writing data. The host 1100 may provide a command and an address to the storage device 1200 for the purpose of reading data stored in the storage device 1200.

The host 1100 includes a processor 1110, the host memory 1120, and an interface circuit 1130. For example, an application program, a file system, a device driver, or the like may be loaded onto the host memory 1120. Besides, data or a variety of software which is driven in the host 1100 may be loaded onto the host memory 1120. In particular, the host 1100 may allocate a partial region of the host memory 1120 as (or for) a buffer of the storage device 1200. Hereinafter, the partial region of the host memory 1120 allocated as a buffer of the storage device 1200 is referred to as the "host memory buffer (HMB) 1125".

The host memory buffer 1125 is allocated to allow the storage device 1200 to use the host memory 1120 as a buffer. In particular, according to embodiments of the inventive concepts, data which are encoded to the error correction code at the storage device 1200 or which have parity may be stored in the host memory buffer 1125. Once the host memory buffer 1125 is allocated as a buffer of the storage device 1200, with regard to the host memory buffer 1125, the storage device 1200 operates as a master, and the host memory 1120 operates as a slave. Accordingly, the host 1100 cannot have any authority substantially with regard to ensuring the reliability of data (hereinafter referred to as "buffering data") stored in the host memory buffer 1125.

The buffering data stored in the host memory buffer 1125 of the inventive concepts have parity or an error correction code encoded at the storage device 1200. The buffering data are transferred to the storage device 1200 without separate processing by the host 1100. However, the buffering data provided from the host memory buffer 1125 may be decoded by using a separate error correction engine provided in the storage device 1200. Accordingly, the reliability of data stored in the host memory buffer 1125 may be secured.

The interface circuit 1130 provides a physical connection between the host 1100 and the storage device 1200. That is, the interface circuit 1130 may convert a command, an address, data, etc. which correspond to various access requests generated from the host 1100, so to be suitable for an interface manner with the storage device 1200. A protocol of the interface circuit 1130 may include for example at least any one of universal serial bus (USB), small computer system interface (SCSI), PCI express, ATA, parallel ATA (PATA), serial ATA (SATA), serial attached SCSI (SAS), and universal flash storage (UFS).

The storage device 1200 may be provided as data storage of the host 1100. The storage device 1200 includes a serial interface 1220, a storage controller 1240, and the nonvolatile memory device 1260. The storage device 1200 may access the nonvolatile memory device 1260 in response to a command CMD from the host 1100 or may perform various operations requested by the host 1100.

The serial interface 1220 is provided as a physical communication channel of the storage device 1200 for data exchange with the host 1100. The serial interface 1220 may have an interfacing protocol which allows the host memory buffer 1125 to support a buffer function of the storage device 1200. That is, the serial interface 1220 may support an interfacing manner for mutually sharing a memory resource of the host 1100 and a memory resource of the storage device 1200. For example, the serial interface 1220 may make it possible for the storage controller 1240 to manage the host memory buffer 1125 and an internal buffer (not illustrated) of the storage device 1200 by using one memory map.

The storage controller 1240 provides interfacing between the host 1100 and the storage device 1200. The storage controller 1240 may write user data in the nonvolatile memory device 1260 depending on a request from the host 1100. In this case, write data provided from the host 1100 may be written in the nonvolatile memory device 1260 after being buffered in the host memory buffer 1125. In addition, the storage controller 1240 may output data stored in the nonvolatile memory device 1260 to the host 1100 in response to a command from the host 1100. The data stored in the nonvolatile memory device 1260 may be transferred to the host 1100 (e.g., processor 1110) after being stored in the host memory buffer 1125 by the storage controller 1240.

For ECC processing, the storage controller 1240 may include a first error correction code engine (e.g., an ECC unit ECC1) 1242 and a second error correction code engine (e.g., an ECC unit ECC2) 1244. The storage controller 1240 may include the first error correction code engine 1242 for encoding and decoding of an error correction code of buffering data stored in the host memory buffer 1125. The storage controller 1240 may include the second error correction code engine 1244 for encoding and decoding of an error correction code of data which are exchanged with the nonvolatile memory device 1260.

The nonvolatile memory device 1260 is provided as a storage medium of the storage device 1200. The nonvolatile memory device 1260 includes a nonvolatile memory such as for example flash memory, phase-change RAM (PRAM), magnetic RAM (MRAM), resistive RAM (ReRAM), or ferroelectric RAM (FRAM), or the like.

According to embodiments of the inventive concepts, the storage device 1200 may process an error correction code associated with buffering data stored in the host memory buffer 1125. The buffering data may include mapping data or metadata for managing the nonvolatile memory device 1260. In the case where an error which occurs at the buffering data is transmitted without correction, a problem may occur with regard to overall control or management of the storage device 1200. Accordingly, it is important to secure the reliability of the host memory buffer 1125 which is placed within the host 1100 but is allocated as (or for) a buffer of the storage device 1200. The storage device 1200 of the inventive concepts may cope with the above issue by using the first error correction engine 1242 which is fully in charge of error management of the buffering data.

Figure 2:
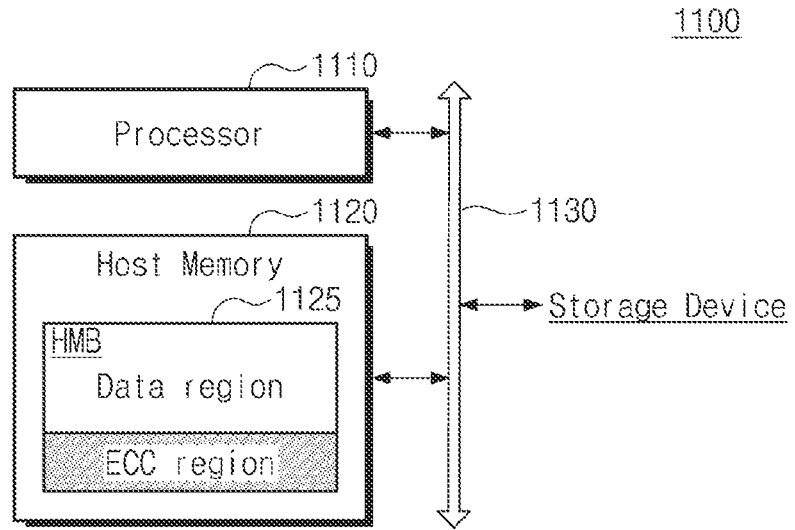
FIG. 2 illustrates a block diagram of an exemplary configuration of a host illustrated in FIG. 1.

FIG. 2 illustrates a block diagram of an exemplary configuration of the host 1100 illustrated in FIG. 1. Referring to FIG. 2, the host 1100 includes the processor 1110, the host memory 1120, and the interface circuit 1130.

The processor 1110 executes a variety of software (e.g., an application program, an operating system, and a device driver) loaded onto the host memory 1120. The processor 1110 may for example execute an operating system (OS) and application programs. The processor 1110 may for example be implemented with a homogeneous multi-core processor or a heterogeneous multi-core processor.

The host memory 1120 is a memory provided in the host 1100. For example, the host memory 1120 may be implemented with a volatile memory such as for example a DRAM or an SRAM, or may be implemented with a nonvolatile memory. However, it should be understood that the host memory 1120 may be variously implemented depending on a purpose. The host memory 1120 may store or output data requested by the host 1100. In addition, the host memory buffer 1125 which is allocated as a buffer of the storage device 1200 is included in the host memory 1120. The host memory buffer 1125 may be allocated to a particular memory region of the host memory 1120 or may be allocated on the host memory 1120 with an optimum size according to information of the storage device 1200.

The host memory buffer 1125 is a partial region of the host memory 1120, which is allocated to be used as a buffer of the storage device 1200. Accordingly, the storage device 1200 may use the host memory buffer 1125 without a separate internal buffer. That is, a separate internal buffer may not be provided in the storage device 1200. Due to various concerns such as cost, device size, and limits on design, it may be difficult to provide an internal buffer having sufficient capacity in the storage device 1200. Instead, in the case of sharing resources of the host memory buffer 1125, the storage device 1200 may secure sufficient buffer capacity.

Buffering data which are stored in the host memory buffer 1125 are stored after being encoded to an error correction code. Accordingly, the buffering data may include a codeword or parity according to ECC encoding. The storage device 1200 may perform ECC encoding on the buffering data and may store the ECC encoded data in the host memory buffer 1125. For example, after performing the ECC encoding, the storage device 1200 may store data in a data region of the host memory buffer 1125, and may store parity in an ECC region (which may be characterized as a parity region). However, in the case where the error correction code is not divided into data and parity, the error correction code may be stored in the host memory buffer 1125 without data and parity division.

The interface circuit 1130 provides a physical connection between the host 1100 and the storage device 1200. That is, the interface circuit 1130 may convert a command, an address, data, etc. which correspond to various access requests generated from the host 1100, so to be suitable for an interface with the storage device 1200. A protocol of the interface circuit 1130 may include at least any one of for example universal serial bus (USB), small computer system interface (SCSI), PCI express, ATA, parallel ATA (PATA), serial ATA (SATA), serial attached SCSI (SAS), and universal flash storage (UFS), or the like.

As described previously, the host 1100 may allocate a partial region of the host memory 1120 as a buffer of the storage device 1200. However, the host 1100 cannot have authority to manage data with regard to the partial region of the host memory 1120 allocated to the host memory buffer 1125. The partial region of the host memory 1120 allocated to the host memory buffer 1125 is managed by the storage controller 1240 of the storage device 1200. The storage controller 1240 may include the first error correction code engine 1242 for securing the reliability of buffering data stored in the host memory buffer 1125.

Figure 3:
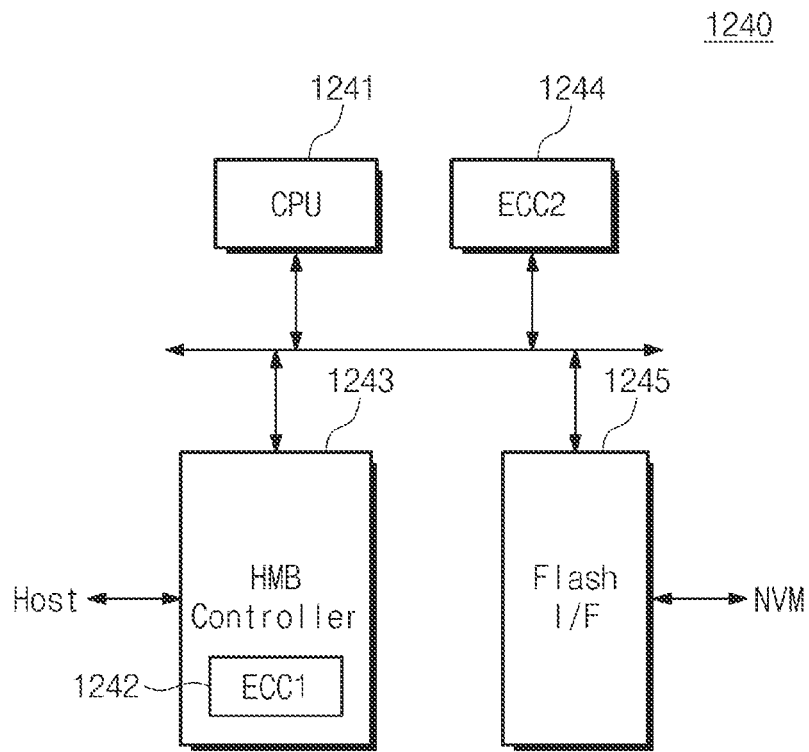
FIG. 3 illustrates a block diagram of an exemplary configuration of a storage controller illustrated in FIG. 1.

FIG. 3 illustrates a block diagram of an exemplary configuration of the storage controller 1240 illustrated in FIG. 1. Referring to FIG. 3, the storage controller 1240 includes a central processing unit (CPU) 1241, an HMB controller 1243, the second error correction code engine 1244, and a flash interface (I/F) 1245. In particular, the HMB controller 1243 may include the first error correction code engine 1242 for data stored in the host memory buffer 1125.

The CPU 1241 may perform various memory management operations of the storage device 1200. For example, the CPU 1241 may control the HMB controller 1243 and the flash interface 1245 in response to a command from the host 1100 for the purpose of writing data in the nonvolatile memory device 1260. The HMB controller 1243 may perform ECC encoding on buffering data to be transferred to the host 1100 through a direct memory access (DMA). The HMB controller 1243 may write the ECC encoded buffering data in the host memory buffer 1125. In the case where the buffering data are required, the CPU 1241 requests the HMB controller 1243 to read the buffering data from the host memory buffer 1125. In this case, the HMB controller 1243 may read the buffering data from the host memory buffer 1125. The HMB controller 1243 may perform ECC decoding on the read buffering data. An error included in the buffering data may be detected or corrected through the ECC decoding.

The CPU 1241 may manage the nonvolatile memory device 1260 by using the ECC decoded buffering data. Alternatively, in the case where the buffering data are data to be stored in the nonvolatile memory device 1260, the CPU 1241 may control the flash interface 1245 such that the buffering data are written in the nonvolatile memory device 1260. The flash interface 1245 transfers the buffering data to the nonvolatile memory device 1260 under control of the CPU 1241.

A control operation of the CPU 1241 in the case of writing the buffering data in the nonvolatile memory device 1260 is described above. However, in the case of receiving a request for reading data stored in the nonvolatile memory device 1260 from the host 1100, the CPU 1241 may control the HMB controller 1243 and the flash interface 1245 in a similar manner. However, upon reading data from the nonvolatile memory device 1260, the CPU 1241 may allow the flash interface 1245 to first read data from the nonvolatile memory device 1260. Next, the CPU 1241 may control the HMB controller 1243 such that the read data are buffered in the host memory buffer 1125 and are output to the host 1100. In buffering using the host memory buffer 1125, the storage controller 1240 may always perform ECC encoding and ECC decoding by using the first error correction code engine 1242.

In addition, it should be well understood that the buffering data stored in the host memory buffer 1125 are not limited to mapping data or metadata for managing the storage device 1200. That is, data which are write-requested or read-requested by the host 1100 with regard to the storage device 1200 may be temporarily stored in the host memory buffer 1125.

Figure 4:
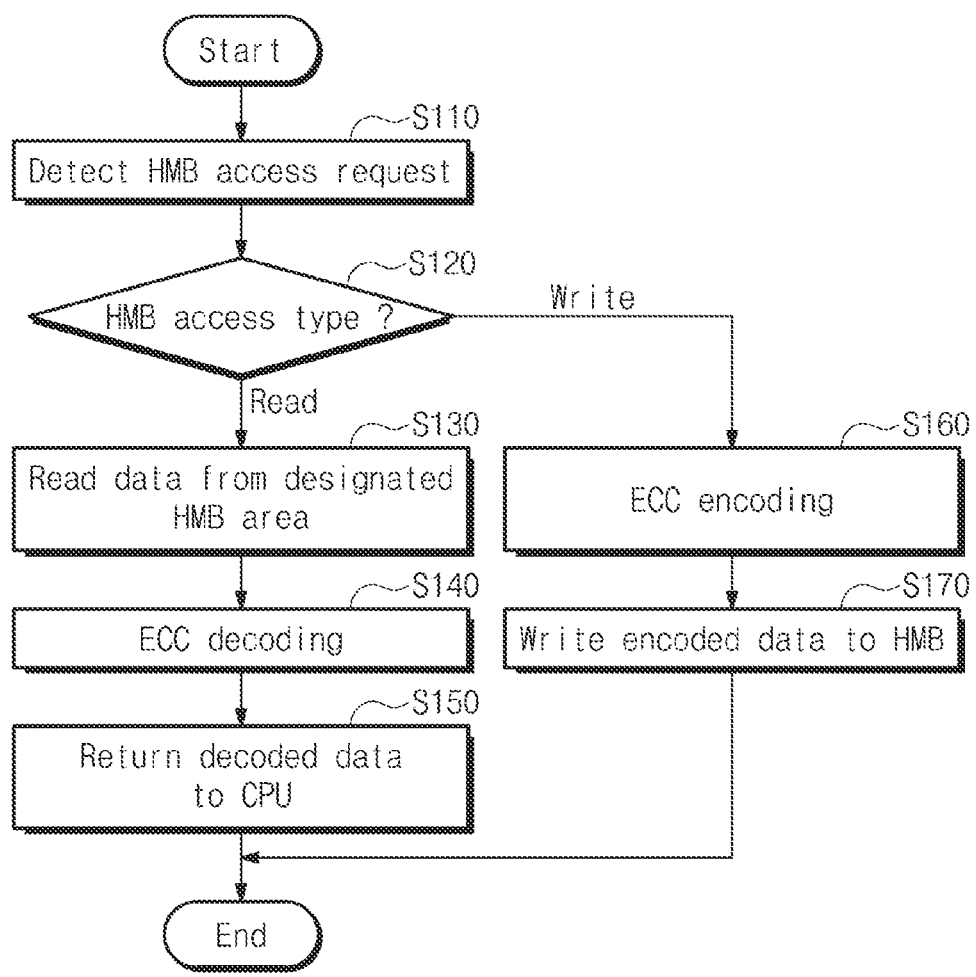
FIG. 4 illustrates a flowchart of an operation of accessing a host memory buffer according to embodiments of the inventive concepts.

FIG. 4 illustrates a flowchart of an operation of accessing a host memory buffer according to embodiments of the inventive concepts. Referring to FIG. 4, the HMB controller 1243 always performs ECC encoding or ECC decoding when accessing the host memory buffer 1125.

In operation S110, the HMB controller 1243 detects or receives a request for an access to the host memory buffer 1125 from the CPU 1241. For example, the HMB controller 1243 may identify a command, which the CPU 1241 writes in an internal register, to check the access request to the host memory buffer 1125.

In operation S1201, the HMB controller 1243 identifies a type of the access request to the host memory buffer 1125. For example, the HMB controller 1243 may determine whether the access request from the CPU 1241 corresponds to a write operation or a read operation. When the access request to the host memory buffer 1125 corresponds to the read operation (Read in S120), the procedure proceeds to operation S130, When the access request to the host memory buffer 1125 corresponds to the write operation (Write in S120), the procedure proceeds to operation S160.

In operation S1301, the HMB controller 1243 reads read-requested data from a specified region of the host memory buffer 1125. In this case, the data read from the host memory buffer 1125 may include a codeword or parity generated through ECC encoding. The HMB controller 1243 may receive the data from the host memory buffer 1125 through the DMA.

In operation S140, the HMB controller 1243 controls the first error correction code engine 1242 to perform ECC decoding on the data read from the host memory buffer 1125. When a result of the ECC decoding indicates that an error is detected from the read data, the HMB controller 1243 may perform an operation for correcting the detected error. In particular, when the detected error is uncorrectable, the HMB controller 1243 may perform an operation such as a read retry operation.

In operation S150, the HMB controller 1243 returns the read data processed through the ECC decoding to the CPU 1241. In this case, the CPU 1241 may perform overall memory management operations of the storage device 1200 with reference to the read data. For example, in the case where the read data are mapping data, the CPU 1241 may access the nonvolatile memory device 1260 by using the mapping data. The data read from the host memory buffer 1125 may be user data to be programmed in the nonvolatile memory device 1260. In this case, the CPU 1241 may control the flash interface 1245 such that the user data are programmed in the nonvolatile memory device 1260 after ECC encoding using the second error correction code engine 1244 (refer to FIG. 3).

In operation S160, the HMB controller 1243 performs ECC encoding on write-requested data to be stored in the host memory buffer 1125 by using the first error correction code engine 1242. Through the first error correction code engine 1242, the write-requested data may be encoded to a codeword or may include a parity bit.

In operation S170, the HMB controller 1243 writes the ECC encoded write data in a specified region of the host memory buffer 1125. The HMB controller 1243 may transfer the write data to the host memory buffer 1125 through the DMA.

A method in which the HMB controller 1243 accesses the host memory buffer 1125, according to embodiments of the inventive concepts, is described above. In particular, the HMB controller 1243 may include the separate first error correction code engine 1242 for processing buffering data stored in the host memory buffer 1125. As an error correction code device dedicated to data buffered in the host memory buffer 1125 is provided, high reliability of the buffering data may be secured.

Figure 5:
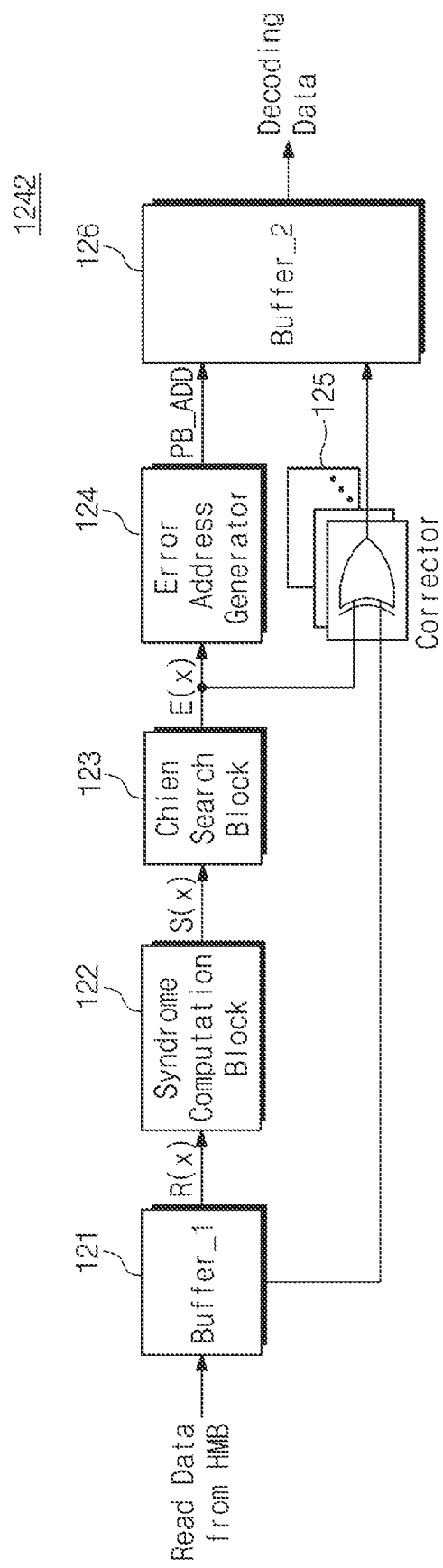
FIG. 5 illustrates a block diagram of an example of a first error correction code engine illustrated in FIG. 3.

FIG. 5 illustrates a block diagram of an example of a first error correction code engine illustrated in FIG. 3. Referring to FIG. 5, the first error correction code engine 1242 may generate a syndrome from read data and may detect an error location by using the syndrome. A description will be given under assumption that a BCH (Bose-Chaudhuri Hocquenghem) code scheme is applied to the first error correction code engine 1242, but it should be well understood that various different error correction coding schemes capable of detecting an error location are applicable to the inventive concepts. The first error correction code engine 1242 includes a first buffer 121, a syndrome computation block 122, a Chien search block 123, an error address generator 124, a corrector 125, and a second buffer 126.

The first buffer 121 stores data R(x) of a codeword unit transferred from the host memory buffer 1125. The data R(x) stored in the first buffer 121 is provided to the syndrome computation block 122.

The syndrome computation block 122 receives the data R(x) to compute a syndrome S(x). For example, the syndrome S(x) may be computed by multiplying a parity detection polynomial H(x) and the read data R(x) together. The parity detection polynomial H(x) may be generated by using a root of a generation polynomial G(x). Whether an error is present in the read data R(x) is detected through the syndrome S(x). The syndrome S(x) includes overall error information of the data R(x). That is, the syndrome S(x) includes a location and a pattern of an error and a size of the error. Accordingly, the syndrome S(x) may be used to perform the following operations on the read data R(x): an operation of detecting an error bit, an operation of correcting an error, and an operation of detecting whether an error is correctable.

The Chien search block 123 generates an error correction vector E(x) by using the syndrome S(x). The syndrome S(x) computed by the syndrome computation block 122 may be transferred to a key equation solver (KES) block (not illustrated). An error location polynomial σ(x) and an error pattern polynomial ω(x) may be generated from the syndrome S(x) by the KES block. The Chien search block 123 computes a root of the error location polynomial. A size of an error corresponding to each of error locations found through the error location polynomial is computed. Upon obtaining error locations and error sizes of the read data R(x) through a Chien search algorithm, the Chien search block 143 outputs the error correction vector E(x) for correcting the error. The error correction vector E(x) includes error location information in the codeword.

The error address generator 124 generates address information of partial data to be overwritten on the second buffer 126 by using the error correction vector E(x). The error address generator 124 may generate a second buffer address PB_ADD corresponding to a location of the second buffer 116 to be overwritten with corrected data.

The corrector 125 corrects data in which an error exists, by using the error correction vector E(x). The corrector 125 may correct an error included in the first data R(x) by performing an XOR operation on the read data R(x) stored in the read buffer 121 and the error correction vector E(x) computed by the Chien search block 123. The error-corrected data may be stored in the second buffer 126.

Figure 6:
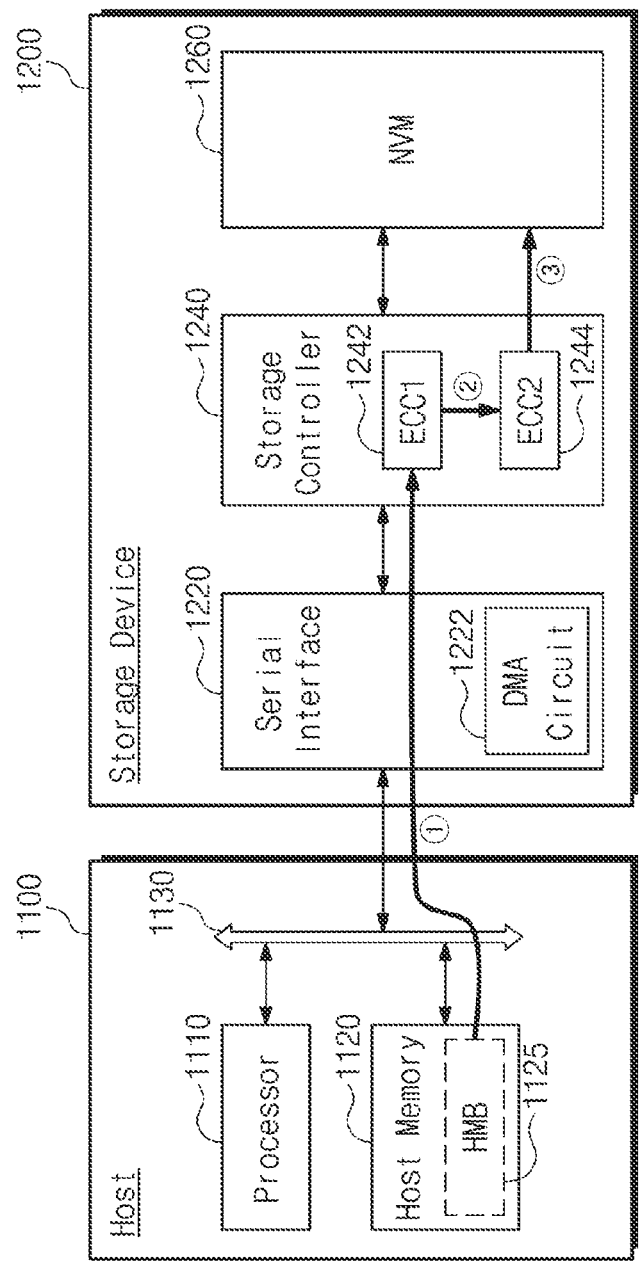
FIG. 6 illustrates a diagram explanatory of a method of managing a host memory buffer according to embodiments of the inventive concepts.

FIG. 6 illustrates a diagram explanatory of a method of managing a host memory buffer according to embodiments of the inventive concepts. Referring to FIG. 6, the storage device 1200 may perform an error correction or repair function on data read from the host memory buffer 1125. Hereinafter, the case where the storage controller 1240 writes data read from the host memory buffer 1125 in the nonvolatile memory device 1260 will be described.

Data read from the host memory buffer 1125 are transferred to the storage controller 1240 through the serial interface 1220. All buffering data which are stored in the host memory buffer 1125 are ECC encoded data. In addition, a DMA circuit (i.e., DMA controller) may be included in a front end device of the storage device 1200 or in the serial interface 1220. In FIG. 6, the DMA circuit 1222 is shown as included in the serial interface 1220. Data of the host memory buffer 1125 may be transferred to the storage controller 1240 via DMA. In FIG. 6, the transfer of data to the storage controller 1240 from the host memory buffer 1125 is indicated by 1.

The first error correction code engine 1242 performs ECC decoding on the data which are read from the host memory buffer 1125 and then transferred to the storage controller 1240. That is, read data are decoded by using the first error correction code engine 1242 which is provided to be fully in charge of ECC encoding and ECC decoding of data exchanged with the host memory buffer 1125. In this case, whether an error is present in the data read from the host memory buffer 1125 is detected. In the case where an error is absent from the data read from the host memory buffer 1125, the storage controller 1240 may perform a memory management operation by using the read data. In addition, in the case of updating the read data at the nonvolatile memory device 1260, the storage controller 1240 may encode the read data by using the second error correction code engine 1244. However, an error correction code operation is performed by the first error correction code engine 1242 when a correctable error is present in the data read from the host memory buffer 1125. The error-corrected data may be used for the memory management operation, or may be transferred to the second error correction code engine 1244 for the purpose of programming the read data in the nonvolatile memory device 1260. In FIG. 6, the transfer of data to the second error correction code engine 1244 is indicated by (2).

However, in the case where an uncorrectable error is present in the data read from the host memory buffer 1125, the storage controller 1240 may perform a read retry operation on data of a specified region of the host memory buffer 1125. In the case where an uncorrectable error is continuously detected even though the read retry operation has been performed as much as a limited count, the storage controller 1240 may request the host 1100 to adjust a memory map of a relevant region of the host memory buffer 1125. That is, an address of the host memory buffer 1125, at which an uncorrectable error is detected, may be remapped onto a normal memory region. An attempt to access an area of the host memory buffer 1125, at which the uncorrectable error is detected, may be blocked by mapping out the area of the host memory buffer 1125.

In the case where the data read from the host memory buffer 1125 are completely processed by the first error correction code engine 1242, the read data may be transferred to the second error correction code engine 1244. The second error correction code engine 1244 performs error detection and correction on all data which are exchanged with the nonvolatile memory device 1260. The data ECC encoded by the second error correction code engine 1244 are programmed in the nonvolatile memory device 1260. In FIG. 6, a sign 3 shows the transfer of data to the nonvolatile memory device 1260 from the second error correction code engine 1244 is indicated by 3.

Overall processes associated with the case where data read from the host memory buffer 1125 is stored in the nonvolatile memory device 1260 are described above. This scenario is only an example for describing functions of the first error correction code engine 1242 and the second error correction code engine 1244 of the inventive concepts. Data read from the host memory buffer 1125 may be mapping data or metadata. Accordingly, the read data may not be stored in the nonvolatile memory device 1260.

Figure 7:
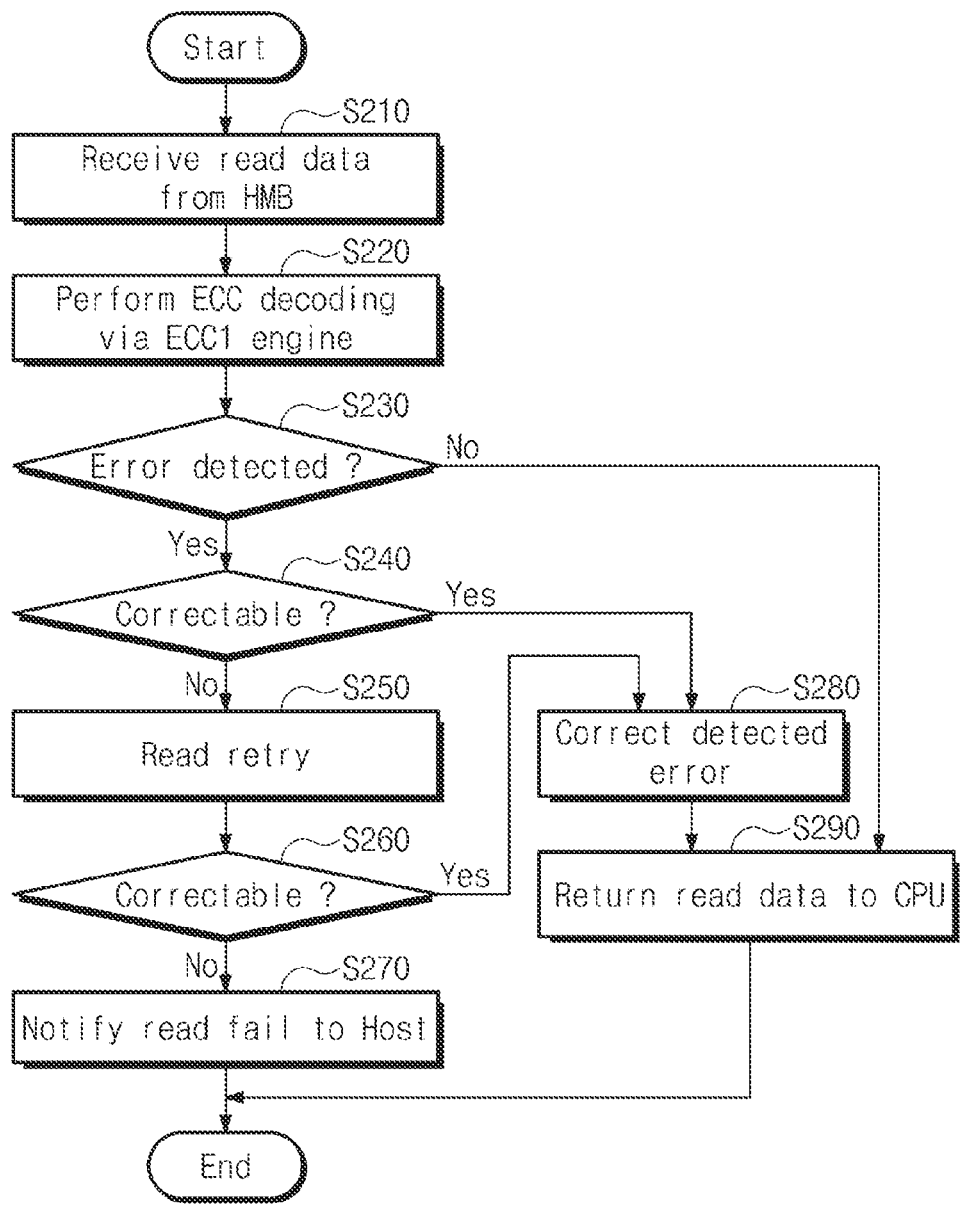
FIG. 7 illustrates a flowchart of a process of reading data from a host memory buffer according to embodiments of the inventive concepts.

FIG. 7 illustrates a flowchart of a process of reading data from a host memory buffer according to embodiments of the inventive concepts. Referring to FIG. 7, the storage controller 1240 performs ECC decoding on data received from the host memory buffer 1125 by using the first error correction code engine 1242. Various memory management operations may be performed based on an ECC decoding result.

In operation S210, the storage controller 1240 receives read data from the host memory buffer 1125. In particular, the HMB controller 1243, which is included in the storage controller 1240 so as to be fully in charge of the host memory buffer 1125, may receive the read data.

In operation S220, the HMB controller 1243 performs ECC decoding on the received read data. The received read data may include parity generated by ECC encoding. Alternatively, the received read data may be transferred in the form of codeword generated by ECC encoding. In particular, the HMB controller 1243 may perform ECC decoding by using the first error correction code engine 1242.

In operation S230, the HMB controller 1243 performs an operation branch depending on the ECC decoding result. When an error is not detected from the data read from the host memory buffer 1125 (No is S230), the flow proceeds to operation S290. When an error is detected from the data read from the host memory buffer 1125 (Yes in S230), the flow proceeds to operation S240.

In operation S240, the HMB controller 1243 performs an operation branch depending on whether the detected error is correctable. For example, in the case where the number of error bits of the read data corresponds to a correctable count (Yes in S240), the flow proceeds to operation S280. In contrast, in the case where the number of error bits of the read data corresponds to an uncorrectable count (No in S240), the flow proceeds to operation S250.

In operation S250, the HMB controller 1243 performs a read retry operation on the host memory buffer 1125 because the error of the read data is uncorrectable. Read data received from the host memory buffer 1125 through the read retry operation is transferred to the HMB controller 1243.

In operation S260, the HMB controller 1243 performs ECC decoding on the data read from the host memory buffer 1125 through the read retry operation. When an ECC decoding result indicates that a correctable error exists (Yes in S260), the flow proceeds to operation S280. In contrast, when an uncorrectable error is present in the data read through the read retry operation (No in S260), the flow proceeds to operation S270.

In operation S270, the HMB controller 1243 notifies the CPU 1241 of the storage controller 1240 of a read fail. In this case, the storage controller 1240 may execute a memory management policy based on information about the read fail. That is, the storage controller 1240 may notify the host 1100 of the read fail and may request the host 1100 to allocate a new host memory buffer 1125. In response to the request, the host 1100 may repair a data region of the host memory buffer 1125, in which an uncorrectable error is present. For example, the host 1100 may set a partial region of the host memory buffer 1125, in which an uncorrectable error is present, to an inaccessible memory region or may replace the partial region with any other normal memory region.

In operation S280, the HMB controller 1243 corrects the detected error of the read data. For example, the HMB controller 1243 corrects a correctable error detected from the read data by using the first error correction code engine 1242.

In operation S290, the HMB controller 1243 returns the error-corrected data to the CPU 1241. The CPU 1241 may perform a memory management operation by using the read data in which an error does not exist. Alternatively, the CPU 1241 may perform an operation for again storing the error-free read data in the nonvolatile memory device 1260 or a memory management operation for transferring the error-free read data to the host 1100.

The manner in which read data received from the host memory buffer 1125 are processed according to embodiments of the inventive concepts is described above. Most data read from the host memory buffer 1125 may be mapping data or metadata. The transmission of an error which is present in data read from the host memory buffer 1125 may have a fatal influence on the storage device 1200. However, the reliability of data read from the host memory buffer 1125 may be secured through the error correction procedure of the inventive concepts.

Figure 8:
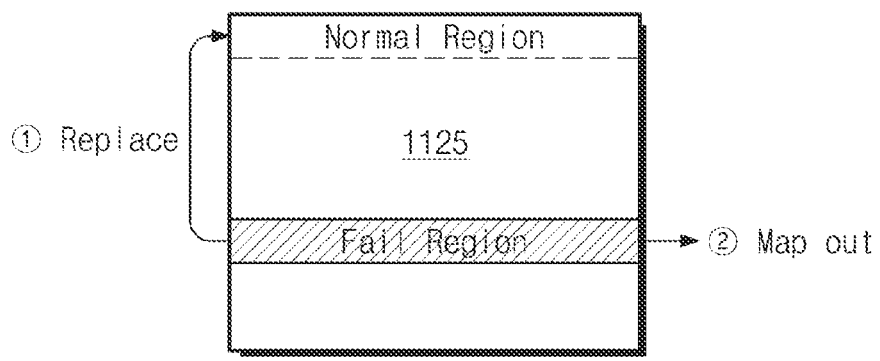
FIG. 8 illustrates a block diagram of an exemplary repair operation of a host memory buffer performed by a host according to embodiments of the inventive concepts.

FIG. 8 illustrates a block diagram of an exemplary repair operation of a host memory buffer performed by a host, according to embodiments of the inventive concepts. Referring to FIG. 8, in response to a read fail notification, the host 1100 may perform a repair operation on a read fail region of the host memory buffer 1125.

The host 1100 may replace the read fail region of the host memory buffer 1125, in which the number of times that an uncorrectable error is detected is not smaller than a particular count or in which a read fail is repeated, with any other normal region. In FIG. 8, this first repair method is indicated by (1). To repair the read fail region, the host 1100 may reconfigure an address mapping table associated with the host memory buffer 1125. That is, in the case where an address of the read fail region is mapped onto an address of the replaced normal region, when an access to the read fail region is requested, the normal region thus replaced may be actually accessed.

Alternatively, the host 1100 may map out the read fail region of the host memory buffer 1125, in which the number of times that an uncorrectable error is detected is not smaller than a particular count or in which a read fail is repeated, from the mapping table. In FIG. 8, this second repair method is indicated by (2). The host 1100 may fundamentally block an access to a fail region by invalidating or deleting an address corresponding to the fail region from an address mapping table for the host memory buffer 1125.

Figure 9:
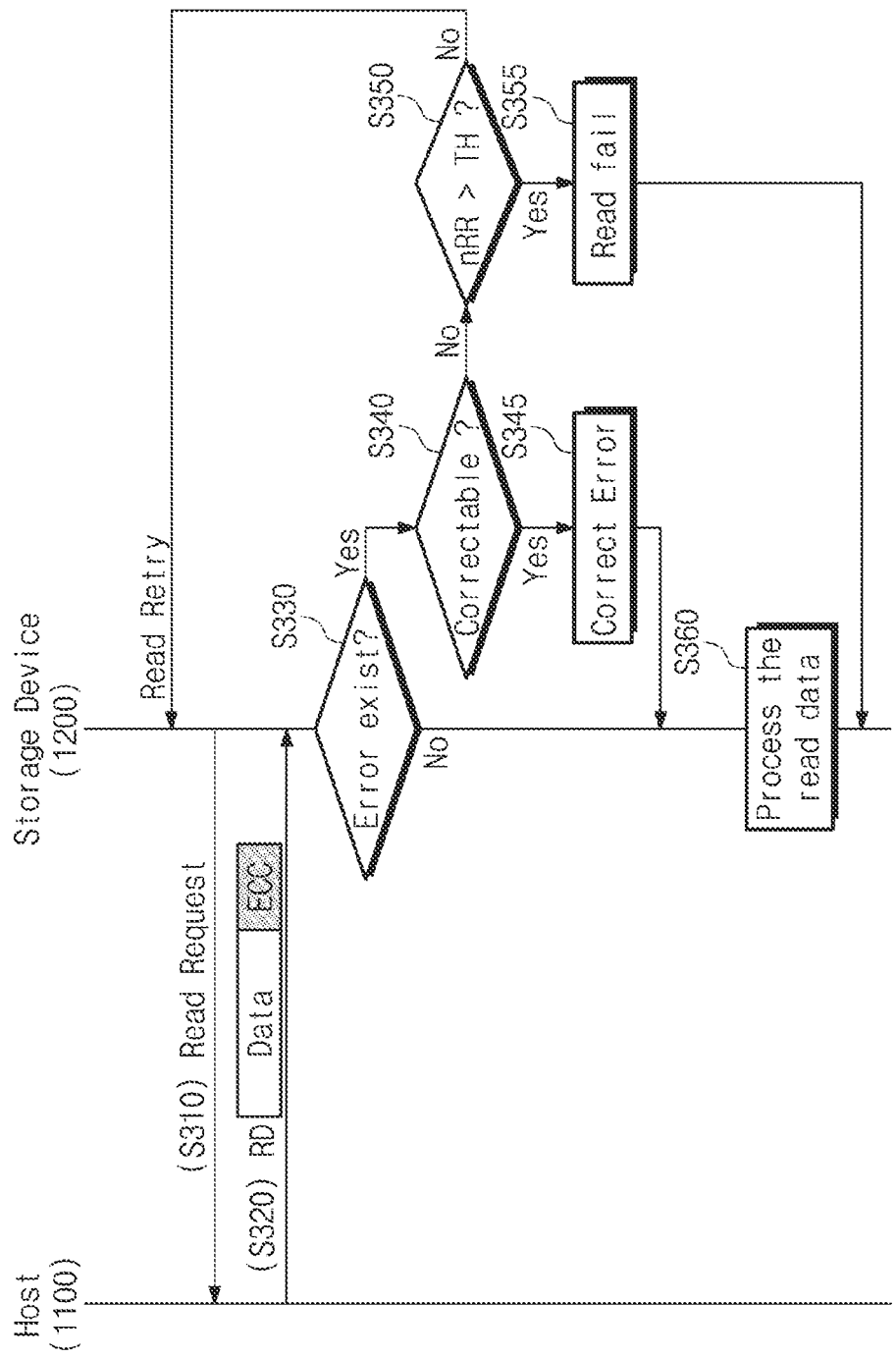
FIG. 9 illustrates a diagram of a data exchange procedure between a host memory buffer and a storage device.

FIG. 9 illustrates a diagram of a data exchange procedure between a host memory buffer and a storage device. A procedure in which the storage device 1200 reads data from the host memory buffer 1125 will be described with reference to FIG. 9.

In operation S310, the storage device 1200 transfers a request for reading data stored in the host memory buffer 1125.

In operation S320, the host memory buffer 1125 transfers data of a specified memory region to the storage device 1200. In this case, read data RD transferred from the host memory buffer 1125 to the storage device 1200 may include a codeword including data and ECC parity. In particular, it should be well understood that the read data RD are transferred in the form of packet of a serial interface manner.

In operation S330, the HMB controller 1243 of the storage device 1200 performs ECC decoding on the received read data RD. The HMB controller 1243 performs ECC decoding by using the first error correction code engine 1242. When an error is not detected from the read data RD provided from the host memory buffer 1125 (No in S330), the flow proceeds to operation S360. When it is determined that an error is detected from the read data RD provided from the host memory buffer 1125 (Yes in S330), the flow proceeds to operation S340.

In operation S340, the HMB controller 1243 performs an operation branch depending on whether the detected error is correctable. When the number of error bits of the read data corresponds to a correctable count (Yes in S340), the flow proceeds to operation S345. In contrast, when the number of error bits of the read data corresponds to an uncorrectable count (No in S340), the flow proceeds to operation S350.

In operation S345, the HMB controller 1243 corrects the error of the read data RD. Next, in operation S360, the storage controller 1240 processes the read data RD transferred from the HMB controller 1243. For example, the storage controller 1240 may perform a memory management operation by using the read data RD received from the host memory buffer 1125 or may transfer the read data RD to the host 1100 or the nonvolatile memory device 1260.

In contrast, in operation S350, it is determined whether the current number of times nRR that a read operation is performed on the host memory buffer 1125 exceeds a threshold value TH. That is, nRR corresponds to a retry count. When the current number of times nRR that a read operation is performed on the host memory buffer 1125 is smaller than or equal to the threshold value TH (No in S350), the flow proceeds to a procedure for a read retry operation. In contrast, when the current number of times nRR that a read operation is performed on the host memory buffer 1125 is greater than the threshold value TH (Yes in S350), the flow proceeds to operation S355.

In operation S355, the HMB controller 1243 may notify the CPU 1241 (refer to FIG. 3) of a read fail of the host memory buffer 1125. In response to the notification, the CPU 1241 may activate a memory management policy corresponding to the read fail situation.

Figure 10:
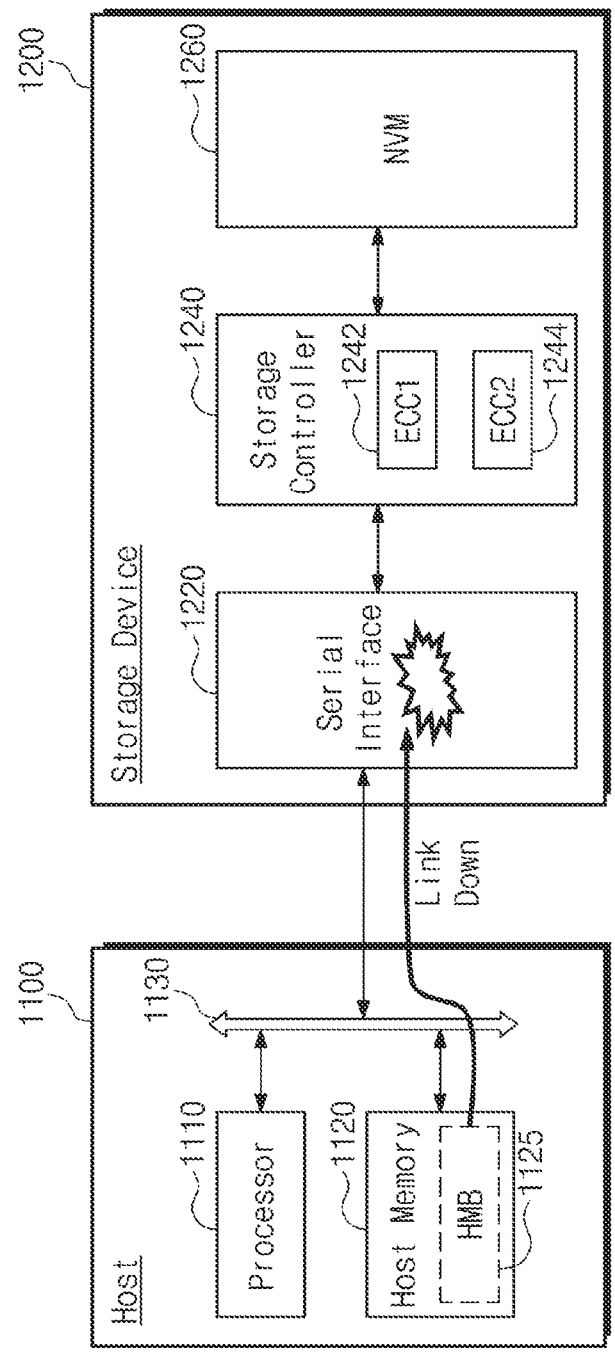
FIG. 10 illustrates a diagram explanatory of a characteristic of a storage device according to other embodiments of the inventive concepts.

FIG. 10 illustrates a diagram explanatory of a characteristic of a storage device according to embodiments of the inventive concepts. Referring to FIG. 10, the storage device 1200 may release a system hang which occurs in a link down state which happens to occur when data are in the process of being transferred from the host memory buffer 1125.

Data read from the host memory buffer 1125 responsive to a request of the storage controller 1240 may be transferred to the storage device 1200. Read data transferred from the host memory buffer 1125 may be transferred to the storage controller 1240 through the serial interface 1220. The read data may be transferred in the form of packet so as to be transferred through the serial interface 1220. However, an event may occur whereby packet transmission ceases due to an error occurring in the serial interface 1220 or noise introduced into a transmission channel. For example, during the process of attempting to transfer one packet, an event may occur whereby only a portion of the packet is transferred and the remaining portion of the packet is not transferred. In this case, a DMA circuit of the serial interface 1220 fails to completely receive a packet, and an operation of a system may cease. This state or condition is called a "DMA hang". In the case where a DMA hang occurs, the transmission of data through the serial interface 1220 or overall operations of the storage device 1200 may cease.

To solve or remove the DMA hang, the storage device 1200 of the inventive concepts may release the system hang by filling a transmission-ceased packet with dummy data (or garbage data) to reconstitute a transmission packet. Alternatively, the storage device 1200 of the inventive concepts may restore an imperfect packet by performing an error correction operation on the transmission-ceased packet. Since the imperfect packet does not include read data but has a perfect packet form, the DMA hang may be solved or removed.

When data are transferred from the host memory buffer 1125, the storage controller 1240 may recognize that the serial interface 1220 is in a state where data transmission has ceased. The storage controller 1240 may fill a lost portion of the received packet with dummy data in response to detecting the link down state of the serial interface 1220. The DMA hang state may be released by transferring a packet completed by using the dummy data to the DMA circuit. Of course, the received packet may be processed as invalid data.

In another embodiment, in the case where the DMA hang occurs, the storage controller 1240 may perform ECC decoding by using a portion of the received packet. In the case where a result of the ECC decoding indicates that it is possible to restore the remaining portion of the lost packet, the restored data may be processed as receive data. Accordingly, the DMA hang state may be solved or removed.

Figure 11:
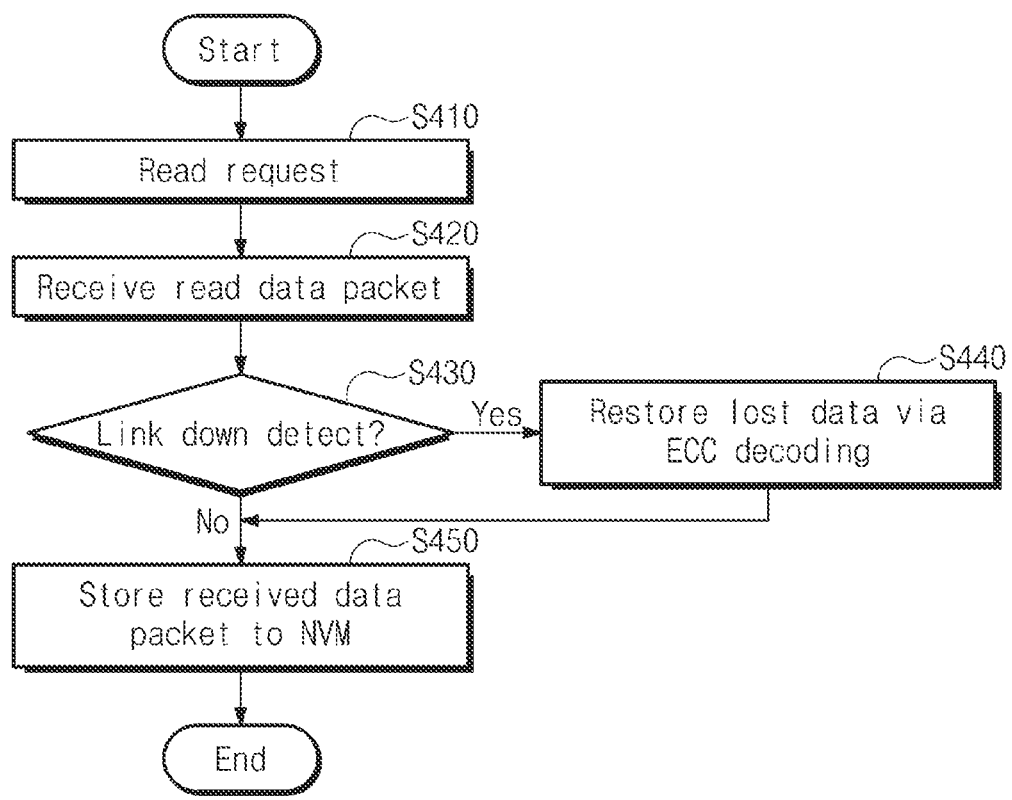
FIG. 11 illustrates a flowchart of an operation of a storage device according to embodiments of the inventive concepts, when a link down event occurs.

FIG. 11 illustrates a flowchart of an operation of a storage device according to embodiments of the inventive concepts, when a link down event occurs. Referring to FIG. 11, the storage device 1200 may release a link down or DMA hang state by using a first error correction code engine (such as first error correction code engine 1242 of FIG. 1).

In operation S410, the storage controller 1240 transfers a request for reading data stored in the host memory buffer 1125. In response to the read request, a read operation and an output operation are performed on a specified memory location of the host memory buffer 1125 by a DMA circuit provided in the serial interface 1220. In this case, data may be transferred to the serial interface 1220 in the form of packet.

In operation S420, the storage controller 1240 receives read data transferred by the DMA circuit of the serial interface 1220 in the unit of a packet. That is, read data may be constituted by using link information of a plurality of packets received.

In operation S430, the storage controller 1240 monitors potential occurrence of a link down condition or DMA hang of the serial interface 1220. When it is determined that the link down occurs in a situation where one packet is in the process of being transferred (Yes in S430), the flow proceeds to operation S440. In contrast, in the case where the link down or DMA hang does not occur (No in S430), the flow proceeds to operation S450.

In operation S440, the storage controller 1240 performs ECC decoding by using only the received portion of the packet being transferred. In the case where it is possible to restore the lost portion of the packet by using ECC decoding, the storage controller 1240 restores data of the lost portion.

In operation S450, the storage controller 1240 performs an additional procedure for storing received data in the nonvolatile memory device 1260.

As described above, the link down or DMA hang state may be solved by restoring lost data through ECC decoding of the inventive concepts when the link down or DMA hang event occurs.

Figure 12:
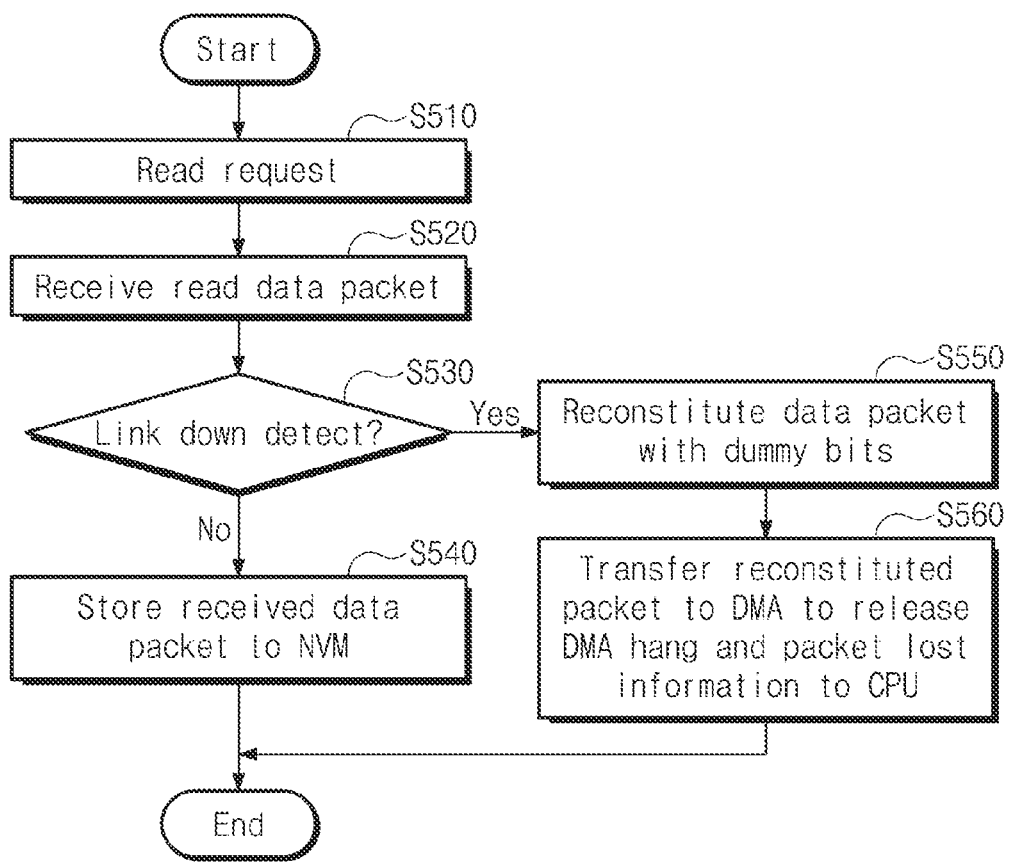
FIG. 12 illustrates a flowchart of an operation of a storage device according to other embodiments of the inventive concepts, when a link down event occurs.

FIG. 12 illustrates a flowchart of an operation of a storage device according to other embodiments of the inventive concepts, when a link down event occurs. Referring to FIG.

12, the storage device 1200 may release a link down or DMA hang state by using dummy data.

In operation S510, the storage controller 1240 transfers a request for reading data stored in the host memory buffer 1125. In response to the read request, a read operation and an output operation are performed on a specified memory location of the host memory buffer 1125 by a DMA circuit provided in the serial interface 1220. In this case, data may be transferred to the serial interface 1220 in the form of packet.

In operation S520, the storage controller 1240 receives read data transferred by the DMA circuit of the serial interface 1220 in the unit of a packet. That is, read data may be constituted by using link information of a plurality of packets received.

In operation S530, the storage controller 1240 monitors potential occurrence of a link down or DMA hang of the serial interface 1220. When it is determined that the link down occurs in a situation where one packet is in the process of being transferred (Yes in S530), the flow proceeds to operation S550. In contrast, in the case where the link down or DMA hang does not occur (No in S530), the flow proceeds to operation S540.

In operation S540, the storage controller 1240 performs data processing for storing received data in the nonvolatile memory device 1260. That is, the storage controller 1240 may perform ECC encoding on the received data by using the second error correction code engine 1244 for the purpose of programming the received data in the nonvolatile memory device 1260. Of course, the received data may also be transferred to the host 1100.

In operation S550, the storage controller 1240 performs packet restoration for the purpose of filling a lost portion of the packet being transferred when the link down or DMA hang is detected with dummy bits. For example, a packet may be reconstituted by maintaining bits of a received portion of the packet and filling a lost portion not received with logic "1".

In operation S560, the storage controller 1240 provides one packet thus reconstituted to a DMA circuit to release the DMA hang. In addition, data lost information (e.g., packet lost information) may be transferred to the CPU 1241 for the purpose of providing notification that the reconstituted packet is invalid data.

Operations of the storage device 1200 of the inventive concepts, which may release a system hang state when a link down or DMA hang event occurs, are described above. Since the storage device 1200 operates as a master with regard to the host memory buffer 1125, intervention of the host 1100 with respect to data stored in the host memory buffer 1125 may be impossible. Accordingly, the host 1100 fails to intervene in solving a link down or DMA hang situation that occurs while transferring data stored in the host memory buffer 1125. The storage device 1200 of the inventive concepts however may perform restoration or error correction on a packet transferred in this situation, thus preventing a situation in which a system ceases to operate properly.

Figure 13:
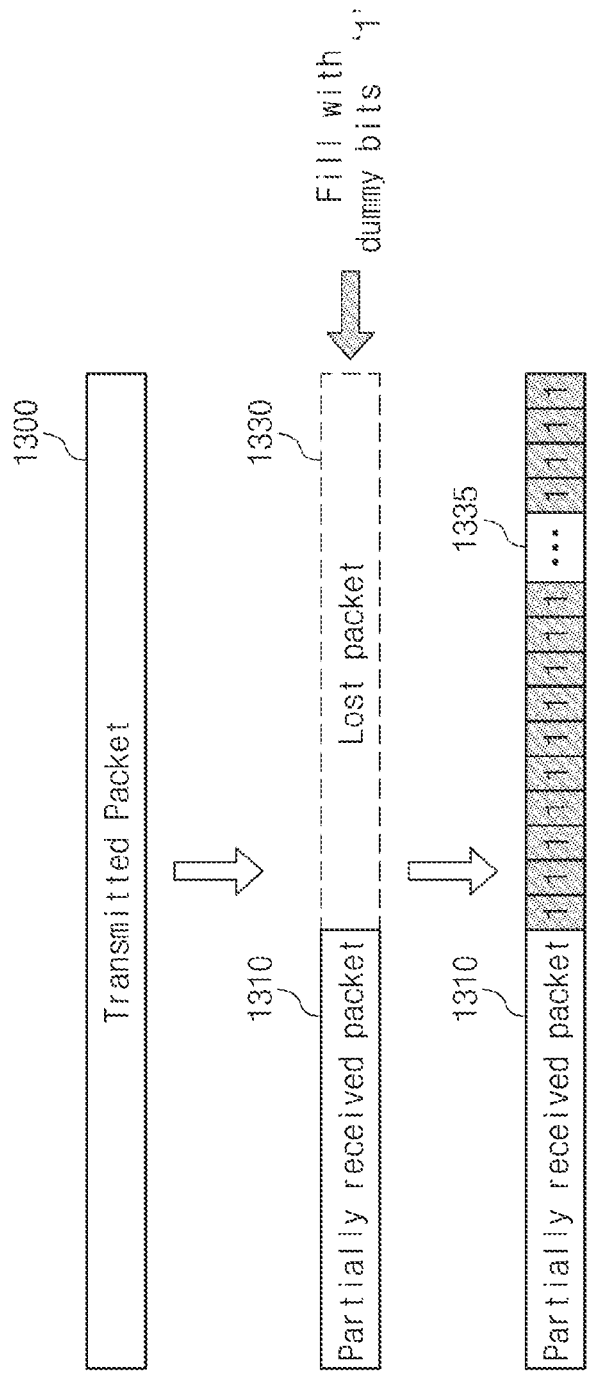
FIG. 13 illustrates a diagram explanatory of a method of restoring data transferred to a host memory buffer, which is described with reference to FIG. 12.

FIG. 13 illustrates a diagram explanatory of a method of restoring data transferred from a host memory buffer, which is described with reference to FIG. 12. Referring to FIG. 13, a portion of a packet which is transferred from the host memory buffer 1125 to the storage device 1200 may be lost. The loss of the packet causes a DMA hang or link down state. In the inventive concepts, it may be possible to release the DMA hang or link down state due to the packet loss.

Packet data 1300 which are transferred from the host memory buffer 1125 to the storage device 1200 are illustrated in FIG. 13. Data which are transferred from the host memory buffer 1125 may be divided into packets and may be transferred in the unit of a packet. For example, one packet may include a header and a payload. The packets may be reconstituted in the unit of one data by using link information included in the header.

In the process of transferring the packet 1300 from the host memory buffer 1125, only a portion of the packet 1300 may be received by the storage device 1200 when a link down event occurs due to an error or noise. The storage device 1200 may receive only a portion 1310 of the packet 1300 due to the link down event. That is, only partially received packet 1310 may be received. The remaining portion of the packet 1300 corresponds to a lost packet portion 1330. The packet loss may cause the DMA hang or system hang state. Accordingly, the storage controller 1240 of the inventive concepts may determine (or in other words regard or deem) that one packet is received, by filling the lost packet portion 1330 with dummy bits. For example, the storage controller 1240 may determine (i.e., regard or deem) that one packet is received, by filling the lost packet portion 1330 with dummy bits of "1".

A packet illustrated in FIG. 13 which is a packet reconstituted by using dummy bits includes the lost packet portion 1330 which is substituted with a dummy bit portion 1335. The reconstituted packet is not meaningful data, but is helpful to solve (i.e., resolve) a system hang situation occurring due to the DMA hang or link down event.

Figure 14:
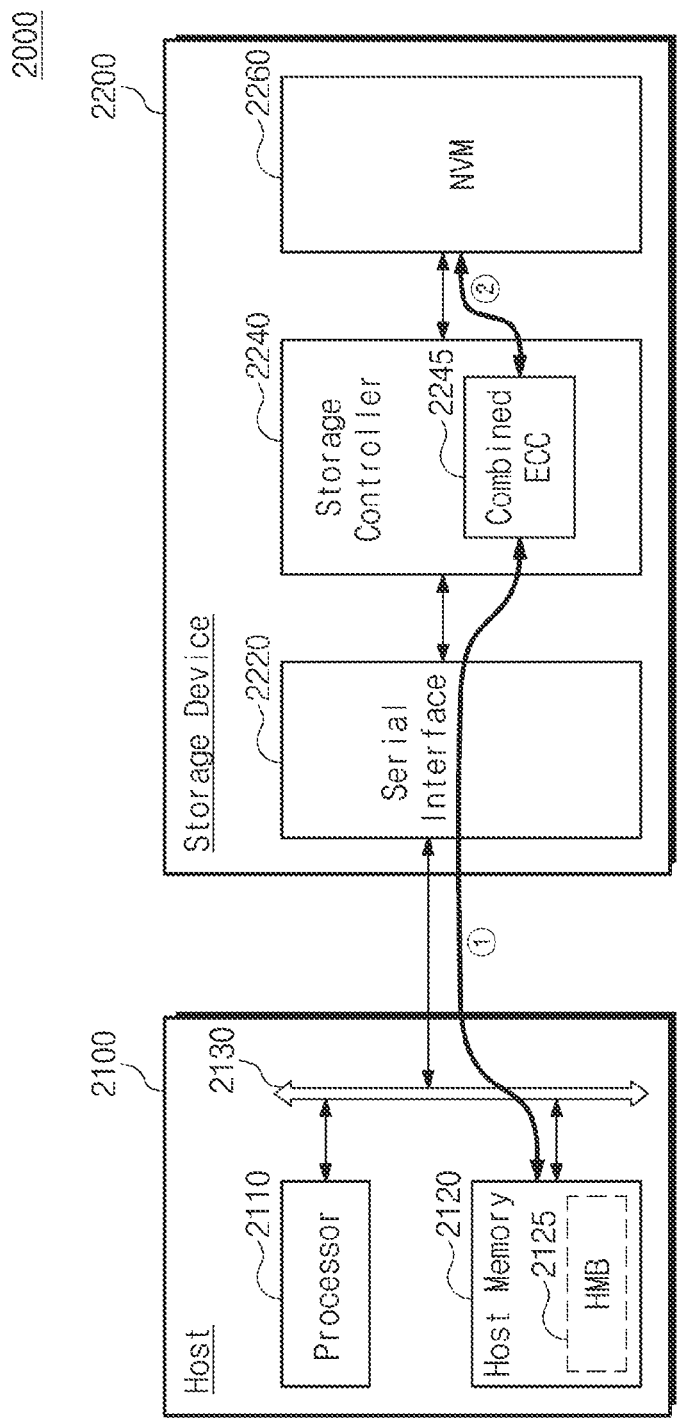
FIG. 14 illustrates a block diagram of a computer system according to other embodiments of the inventive concepts.

FIG. 14 illustrates a block diagram of a computer system according to other embodiments of the inventive concepts. Referring to FIG. 14, a computer system 2000 according to other embodiments includes a host 2100 and a storage device 2200. The configuration and functionality of the host 2100 are described with reference to FIG. 1, and thus, additional description associated with the host 2100 may be omitted from the following to avoid redundancy. That is processor 2110, host memory 2120 including host memory buffer 2125, and interface circuit 2130 in FIG. 14 may be considered as respectively equivalent to processor 1110, host memory 1120 including host memory buffer 1125, and interface circuit 1130 shown in and described with respect to FIG. 1.

The storage device 2200 of the inventive concepts may be provided as data storage of the host 2100. The storage device 2200 in FIG. 14 includes a serial interface 2220, a storage controller 2240, and a nonvolatile memory device 2260. The storage device 2200 may access the nonvolatile memory device 2260 in response to a command CMD from the host 2100 or may perform various operations requested by the host 2100.

The serial interface 2220 is provided as a physical communication channel of the storage device 2200 for data exchange with the host 2100. The storage controller 2240 provides interfacing between the host 2100 and the storage device 2200. The storage controller 2240 may write data in the nonvolatile memory device 2260 responsive to a request from the host 2100. In this case, write data provided from the host 2100 may be written in the nonvolatile memory device 2260 after being buffered in a host memory buffer 2125. In addition, the storage controller 2240 may output data stored in the nonvolatile memory device 2260 to the host 2100 in response to a command from the host 2100. The data stored in the nonvolatile memory device 2260 may be transferred to the host 2100 (e.g., to the processor 2110) after being stored in the host memory buffer 2125 by the storage controller 2240.

The storage controller 2240 includes a combined error correction code engine 2245 for processing an error correction code. The storage controller 2240 uses the combined error correction code engine 2245 for encoding and decoding of an error correction code of data (indicated by path (1)) buffered in the host memory buffer 2125. Also, the storage controller 2240 may use the combined error correction code engine 2245 for the encoding and decoding of an error correction code of data (indicated by path (2)) which are exchanged with the nonvolatile memory device 2260.

That is, the combined error correction code engine 2245 may be used to detect/correct an error of data exchanged with the host memory buffer 2125 and to detect/correct an error of data exchanged with the nonvolatile memory device 2260.

According to an embodiment of the inventive concepts, the storage device 2200 may use the combined error correction code engine 2245 for the purpose of processing data stored in the host memory buffer 2125 and data stored in the nonvolatile memory device 2260. Accordingly, both the reliability of the host memory buffer 2125 allocated as a buffer of the storage device 2200 and the reliability of data associated with the nonvolatile memory device 2260 may be secured.

Figure 15:
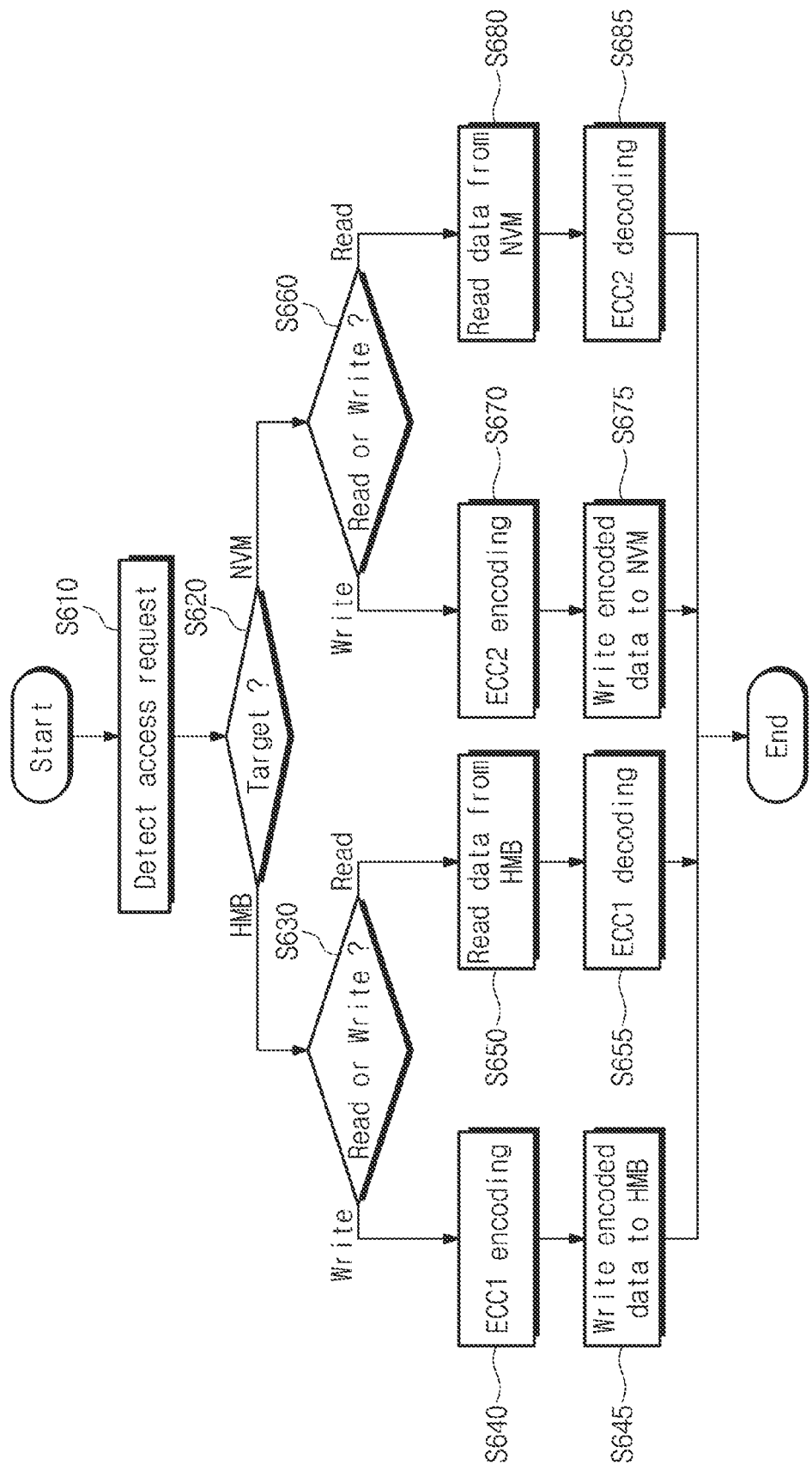
FIG. 15 illustrates a flowchart of an operation of a storage device according to embodiments of the inventive concepts.

FIG. 15 illustrates a flowchart of an operation of a storage device of the inventive concepts. Referring to FIG. 15, the storage controller 2240 may use the combined error correction code engine 2245 for the purpose of buffering data in the host memory buffer 2125 and accessing the nonvolatile memory device 2260.

In operation S610, the storage controller 2240 detects or receives a request for an access to the host memory buffer 2125 or the nonvolatile memory device 2260 by monitoring a command or requests generated in a memory management operation.

In operation S620, the storage controller 2240 identifies a memory targeted for the access request. In the case where the targeted memory is the host memory buffer 2125 (HMB at S620), the flow proceeds to operation S630. In contrast, in the case where the targeted memory is the nonvolatile memory device 2260 (NVM at S620), the flow proceeds to operation S660.

In operation S630, a type of the access request to the host memory buffer 2125 is identified. For example, it is determined whether a type of the access request to the host memory buffer 2125 corresponds to a write operation or a read operation. When the access request to the host memory buffer 2125 corresponds to the write operation (Write at S630), the flow proceeds to operation S640. When the access request to the host memory buffer 2125 corresponds to the read operation (Read at S630), the flow proceeds to operation S650.

In operation S640, the storage controller 2240 processes write-requested data by using the combined error correction code engine 2245. In this case, the write-requested data may be processed according to ECC encoding allocated to the host memory buffer 2125 through the combined error correction code engine 2245.

In operation S645, the storage controller 2240 writes the ECC encoded write data in a specified region of the host memory buffer 2125. The storage controller 2240 may transfer the write data to the host memory buffer 2125 through the DMA.

In operation S650, the storage controller 2240 reads read-requested data from a specified region of the host memory buffer 2125. In this case, the data read from the host memory buffer 2125 may include parity generated through ECC encoding. The storage controller 2240 may receive the data from the host memory buffer 2125 through the DMA.

In operation S655, the storage controller 2240 controls the combined error correction code engine 2245 to perform ECC decoding on the data read from the host memory buffer 2125. When a result of the ECC decoding indicates that an error is present in the read data, the combined error correction code engine 2245 may perform an operation for correcting a detected error. In particular, when the detected error is uncorrectable, the storage controller 2240 may perform an operation such as a read retry operation.

In operation S660, a type of an access request to the nonvolatile memory device 2260 is identified. For example, it is determined whether a type of the access request to the nonvolatile memory device 2260 corresponds to a write operation or a read operation. When the access request to the nonvolatile memory device 2260 corresponds to the write operation (Write at S660), the flow proceeds to operation S670. In contrast, when the access request to the nonvolatile memory device 2260 corresponds to the read operation (Read at S660), the flow proceeds to operation S680.

In operation S670, the storage controller 2240 processes data, which have been requested to be written to the nonvolatile memory device 2260, by using the combined error correction code engine 2245. In this case, the write-requested data may be processed according to ECC2 encoding through the combined error correction code engine 2245.

In operation S675, the storage controller 2240 programs (writes) the ECC encoded write data in a specified region of the nonvolatile memory device 2260.

In operation S680, the storage controller 2240 reads read-requested data from a specified region of the nonvolatile memory device 2260. In this case, the data read from the nonvolatile memory device 2260 may include parity generated through ECC encoding.

In operation S685, the storage controller 2240 controls the combined error correction code engine 2245 to perform ECC decoding on the data read from the nonvolatile memory device 2260. When a result of the ECC decoding indicates that an error is present in the read data, the combined error correction code engine 2245 may perform an operation for correcting a detected error.

A method in which the storage controller 2240 including the combined error correction code engine 2245 according to an embodiment of the inventive concept accesses the host memory buffer 2125 and the nonvolatile memory device 2260 is described above.

Figure 16:
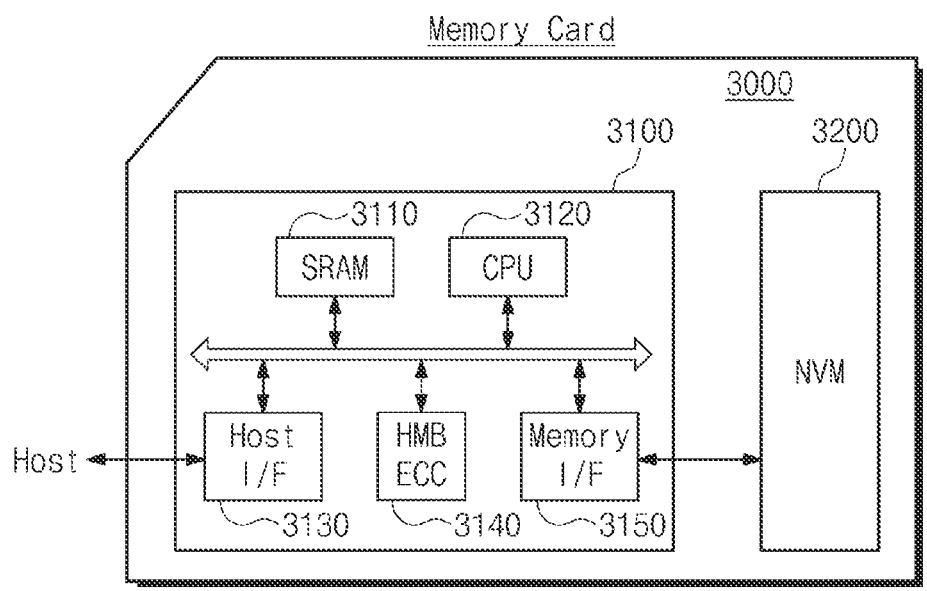
FIG. 16 illustrates a block diagram of a memory card system including a nonvolatile memory system according to embodiments of the inventive concepts.

FIG. 16 illustrates a block diagram of a memory card system including a nonvolatile memory system according to embodiments of the inventive concepts. Referring to FIG. 16, a memory card system 3000 may include a memory controller 3100 and a nonvolatile memory 3200.

The memory controller 3100 is connected with the nonvolatile memory 3200. The memory controller 3100 is configured to access the nonvolatile memory 3200. For example, the memory controller 3100 is configured to control overall operations of the nonvolatile memory 3200 including, but not limited to, a read operation, a write operation, an erase operation, and a background operation. The background operation includes operations such as for example wear-leveling and garbage collection, or the like.

In an embodiment, the memory controller 3100 include an SRAM 3110, a CPU 3120, a host interface (I/F) 3130, an HMB error correction code engine (ECC) 3140, and a memory interface (I/F) 3150. Like the storage controller 1240 described with reference to FIGS. 1 and 3, the memory controller 3100 controls an operation of buffering data by using a host memory buffer HMB (not illustrated). In particular, the memory controller 3100 includes the HMB error correction code engine 3140 for ECC encoding and ECC decoding of buffering data which are stored in and read from the host memory buffer HMB.

The memory controller 3100 may communicate with an external device through the host interface 3130. The memory controller 3100 may communicate with an external device (e.g., a host) in compliance with a particular communication protocol. For example, the host interface 3130 may communicate with the external device in compliance with at least one of various communication protocols such as universal serial bus (USB), multimedia card (MMC), eMMC (embedded MMC), peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), Firewire™, universal flash storage (UFS), and nonvolatile memory express (NVMe), or the like.

The nonvolatile memory 3200 may be implemented with various nonvolatile memory devices such as for example electrically erasable and programmable ROM (EEPROM), NAND flash memory, NOR flash memory, phase-change RAM (PRAM), resistive RAM (ReRAM), ferroelectric RAM (FRAM), and spin-torque magnetic RAM (STT-MRAM), or the like.

In an embodiment, the memory controller 3100 and the nonvolatile memory 3200 may be integrated in a single semiconductor device. The memory controller 3100 and the nonvolatile memory 3200 may be integrated in a single semiconductor device to constitute a memory card. For example, the memory controller 3100 and the nonvolatile memory 3200 may be integrated in a single semiconductor device to form a memory card such as for example a PC card (a personal computer memory card international association (PCMCIA) card), a Compact Flash® card (CF), a smart media card (SM, SMC), a Memory Stick™ (MS), a Multi-Media Card™ (MMC, RS-MMC, MMCmicro, eMMC), Security Digital card (SD®, miniSD™, microSD®, SDHC), and a universal flash storage (UFS), or the like.

Figure 17:
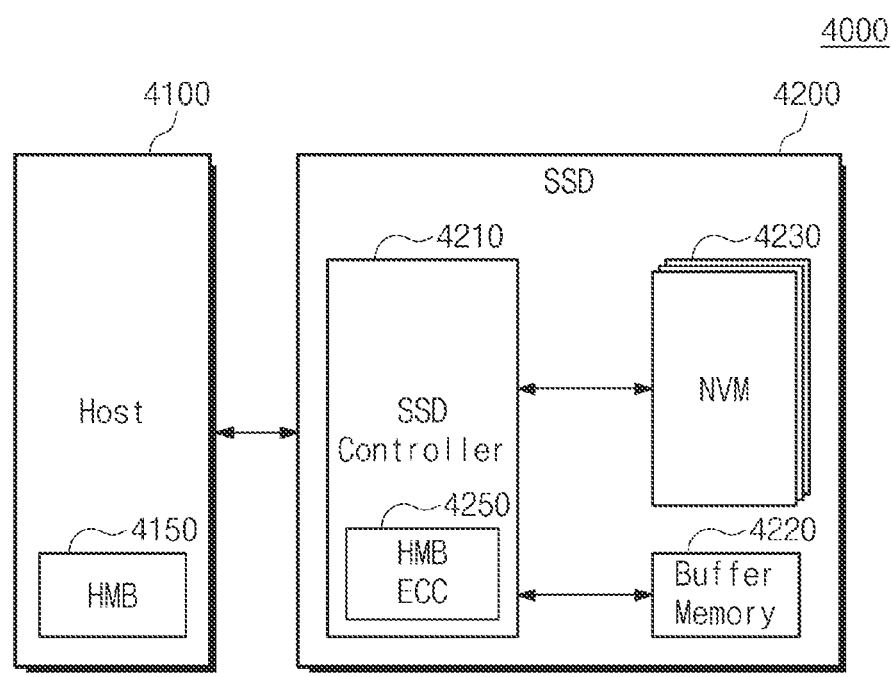
FIG. 17 illustrates a block diagram of a solid state drive (SSD) system including a nonvolatile memory system according to embodiments of the inventive concepts.

FIG. 17 illustrates a block diagram of a solid state drive (SSD) system including a nonvolatile memory system according to embodiments of the inventive concepts. Referring to FIG. 17, an SSD system 4000 includes a host 4100 and an SSD 4200. The SSD 4200 includes a SSD controller 4210, a buffer memory 4220, and a plurality of nonvolatile memory devices 4230.

The host 4100 allocates a partial region of a memory provided in the host 4100 to (or as) a host memory buffer 4150. The authority to access the region allocated to the host memory buffer 4150 may be entrusted to the SSD controller 4210.

The SSD controller 4210 may control the plurality of nonvolatile memory devices 4230 in response to a signal received from the host 4100. In an embodiment, the SSD controller 4210 may perform an error correction operation of data buffered in the host memory buffer 4150, which is described with reference to FIGS. 1 and 3. The SSD controller 4210 may include an HMB error correction code engine 4250 for the purpose of performing an error correction operation on data buffered in the host memory buffer 4150.

The buffer memory 4220 operates as a buffer memory of the SSD 4200. For example, the buffer memory 4220 may temporarily store data received from the host 4100 or from the nonvolatile memory devices 4230, or may temporarily store metadata (e.g., a mapping table). The buffer memory 4220 may include volatile memory such as for example DRAM, SDRAM, double date rate (DDR) SDRAM, low power double data rate (LPDDR) SDRAM, or SRAM, or the like, or nonvolatile memory such as for example FRAM, ReRAM, STT-MRAM, or PRAM. However, depending on allocation of the host memory buffer 4150 of the inventive concepts, the buffer memory 4220 may be provided with a minimum size, and in some embodiments the SSD 4200 may be configured so as not to include buffer memory 4220.

According to embodiments of the inventive concepts, data reliability and system stability of a storage device which has an interface capable of sharing resources of a host memory buffer may be improved.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. A storage controller comprising:
an error correction code (ECC) circuit configured to generate first data,
wherein the storage controller is configured to receive a first command and a second command from an external host device,
the storage controller is configured to transmit the first data to an external host memory buffer allocated by the external device host in response to the first command,
the storage controller is configured to receive second data from the external host memory buffer in response to the second command, and
the first data includes a first parity, and the second data includes a second parity.

2. The storage controller of claim 1, wherein each of the first parity and the second parity includes one or more parity bits.

3. The storage controller of claim 1, wherein the storage controller reads third data stored in a nonvolatile memory, and the ECC circuit generates the first data by performing a decoding process and then an encoding process on the third data.

4. The storage controller of claim 1, wherein the ECC circuit generates fourth data by performing a decoding process and then an encoding process on the second data, and the storage controller writes the fourth data to a nonvolatile memory.

5. The storage controller of claim 1, wherein the first command is to read data stored in the storage device, and the first data is read data.

6. The storage controller of claim 1, wherein the second command is to write data, and the second data is write data.

7. The storage controller of claim 1, wherein the ECC comprises an error correction engine for encoding and decoding of an error correction code of the first and the second data stored in the external host memory buffer.

8. The storage controller of claim 1, wherein the external host device allocates a first partial region of a host memory of the external host device as a buffer for the storage device.

9. The storage controller of claim 8, wherein the storage controller allocates a second partial region of the host memory of the external host device to the external host memory buffer.

10. A storage controller comprising:
an error correction code (ECC) circuit configured to receive first data and generate second data by performing a decoding process and then an encoding process on the first data, and configured to receive third data and generate fourth data by performing the decoding process and then the encoding process on the third data,
wherein the storage controller is configured to receive a first command and a second command from an external host device,
the storage controller is configured to read the first data from an external nonvolatile memory,
the storage controller is configured to transmit the second data to an external host memory buffer allocated by the external host device in response to the first command,
the storage controller is configured to receive the third data from the external host memory buffer in response to the second command,
the storage controller is configured to write the fourth data to the external nonvolatile memory, and
the second data includes a first parity, and the third data includes a second parity.

11. A method comprising:
receiving, by a storage controller, a first command from an external host device;
receiving, by the storage controller, first data from an external host memory buffer allocated by the external host device in response to the first command;
performing, by an ECC circuit, a decoding process and then an encoding process on the first data to generate second data;
writing, by the storage controller, the second data to an external nonvolatile memory;
receiving, by the storage controller, a second command from the external host device;
receiving, by the ECC circuit, third data from the external nonvolatile memory;
performing, by the ECC circuit, the decoding process and then the encoding process on the third data to generate fourth data; and
transmitting, by the storage controller, the fourth data to the external host memory buffer in response to the second command,
wherein the first data includes a first parity, and the fourth data includes a second parity.

12. The method of claim 11, wherein the storage controller includes the ECC circuit.

* * * * *